United States Patent [19]

Soltys et al.

[11] 4,152,229

[45] May 1, 1979

[54] APPARATUS AND METHOD FOR REMOVAL OF SOLUBLE METAL IONS FROM AQUEOUS EFFLUENT

[75] Inventors: Joseph F. Soltys, London, Canada; Harrison L. Heard, East Haven, Conn.

[73] Assignee: London Laboratories Limited, Woodbridge, Conn.

[21] Appl. No.: 897,800

[22] Filed: Apr. 19, 1978

[51] Int. Cl.² ............................ C25C 1/12; C02C 5/12
[52] U.S. Cl. .................................. 204/150; 204/44; 204/52 R; 204/105 R; 204/106; 204/152
[58] Field of Search ................... 204/44, 52 R, 105 R, 204/106, 150, 152

[56] References Cited

U.S. PATENT DOCUMENTS

| | | | |
|---|---|---|---|
| 3,256,504 | 6/1966 | Fidelman | 204/150 X |
| 3,392,102 | 7/1968 | Koch | 204/150 X |
| 3,394,064 | 7/1968 | Fowkes et al. | 204/150 |
| 3,766,036 | 10/1973 | McKaveney | 204/150 |
| 3,816,276 | 6/1974 | Ichiki et al. | 204/152 |
| 4,035,269 | 7/1977 | Mastrorilli | 204/150 |
| 4,040,938 | 8/1977 | Robertson | 204/272 X |

*Primary Examiner*—Arthur C. Prescott
*Attorney, Agent, or Firm*—DeLio and Montgomery

[57] ABSTRACT

Apparatus for removal of soluble metal ions, preferably copper ions, from an effluent solution is provided comprising a chamber for continuous passage of effluent therethrough having high surface area donor and acceptor electrodes in physical contact provided therein. One preferred embodiment comprises a rectangular tank having a multiplicity of high surface area stainless steel and aluminum electrode members comprising screens or expanded or perforated sheets bisecting the flow of effluent therethrough and being in physical contact. An alternate embodiment comprises a cylindrical tank having a "jelly-roll" configuration of stainless steel and alumium screens in physical contact provided in the center of the tank, along its longitudinal axis. A method for removal of soluble metal ions from effluent solution is provided comprising treatment of the effluent by passage through the apparatus of the invention.

9 Claims, 11 Drawing Figures

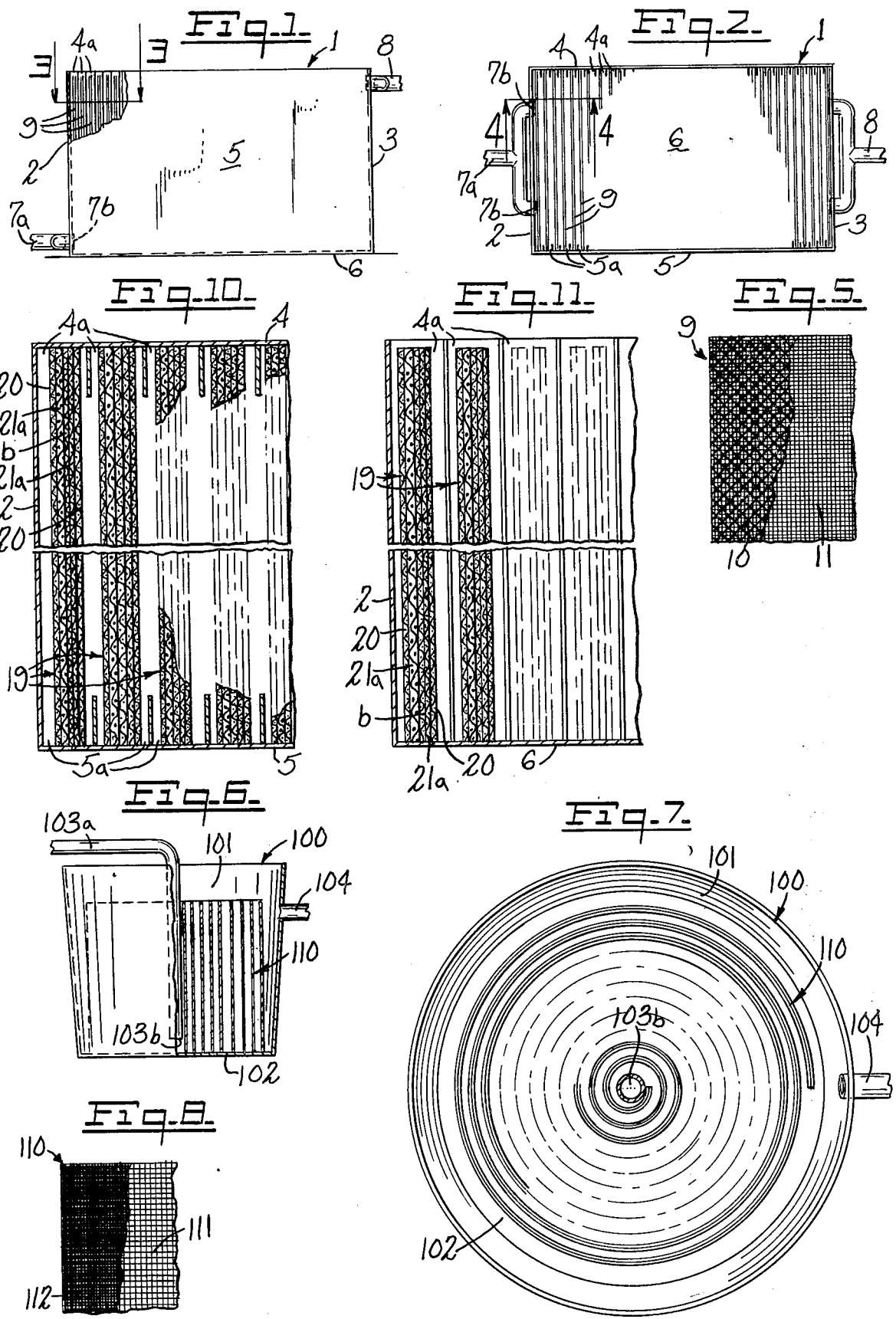

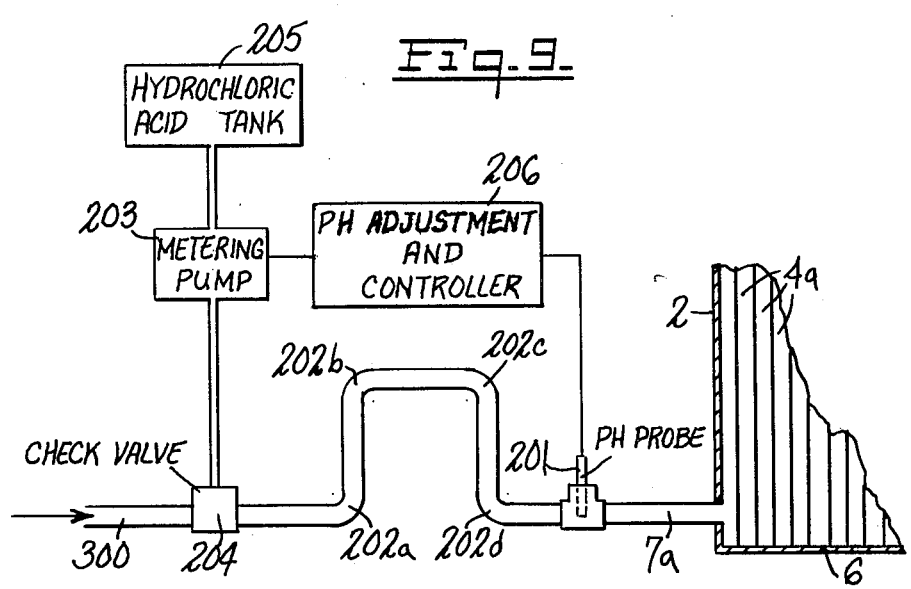
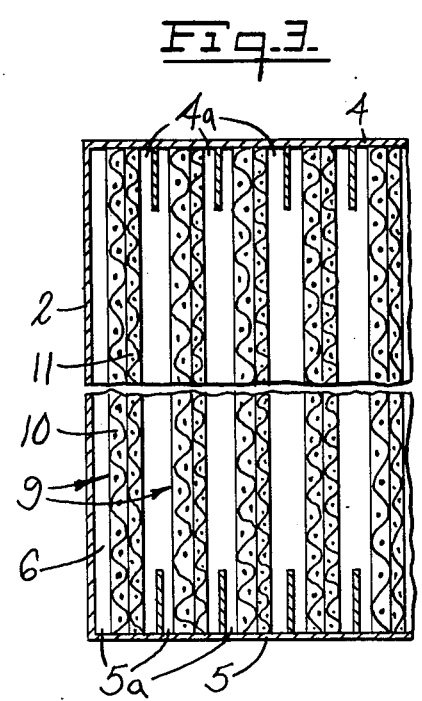
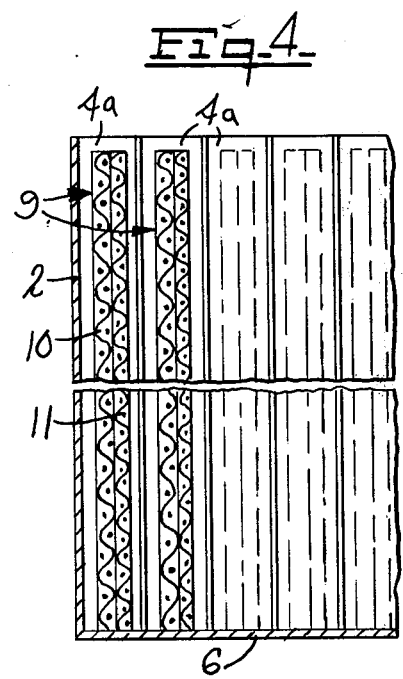

APPARATUS AND METHOD FOR REMOVAL OF SOLUBLE METAL IONS FROM AQUEOUS EFFLUENT

BACKGROUND OF THE INVENTION

The present invention pertains to the removal of soluble metal ions from solution and, more specifically, to apparatus through which an effluent solution containing soluble metal ions is continuously passed for treatment and removal of the metal ions.

In various types of industrial processes and plants, substantial quantities of soluble metallic ions are discharged in waste solutions, generally referred to as effluent. The effluent must be treated so as to either recover or at least remove these metallic ions from solution, prior to discharge of the effluent into the environment. For example, in the metal plating industry, rinse solutions and exhausted plating solutions contain residual amounts of soluble metallic ions. If economically feasible, it may be desirable to recover and recycle the metal remaining in solution. Otherwise, the residual metal must at least be removed from the effluent before it can be disposed of in an environmentally acceptable manner. The invention provides apparatus and a method for removal of such metal ions from even very dilute solutions thereof.

Presently, such soluble metallic ions are most commonly removed from effluent solutions by precipitation and settling, which involves separate treatment that is done on a batch basis. The disadvantages of this approach include incomplete and inefficient removal of the metal, as well as the commercial economics both in terms of time and expense which are involved. In accordance with the invention, it has been discovered that soluble metallic ions can be removed galvanically in an efficient, inexpensive and reliable manner by utilizing the novel apparatus and method of the invention.

Attempts have been made in the past to remove soluble metal ions by electrochemical processes. U.S. Pat. No. 3,859,195 provides apparatus comprising stainless steel and carbon electrodes provided in a "jelly-roll" configuration wherein the anode and cathode are insulated against metal-to-metal electrode contact. This apparatus, however, is connected to a power supply and a potential is established between the electrodes, whereby the metal ion is caused to plate onto the cathode. In contrast, the apparatus of the invention comprises electrodes in direct physical contact which utilize and/or require no application of exterior electromotive force or potential to effect and maintain plating of the soluble metal ions onto the acceptor electrode. The method of the invention utilizes a galvanic, rather than electroplating, process.

Although attempts have been made to remove soluble metal ions using a galvanic process, the invention provides novel improvements thereover. In previous attempts, aluminum electrodes were suspended in effluent solution contained in a tank, in order to effect galvanic plating of copper out of solution over a given period of time. Difficulties and disadvantages, however, are inherent in this batch type of prior art apparatus and method. As copper plates onto the aluminum electrodes, it accumulates to a degree which requires a replacement or removal. As the copper accumulates on the aluminum electrodes, the aluminum passivates, the process slows down and eventually will stop. Furthermore, the time required to remove an acceptable amount of copper ions is too great to allow the method and apparatus to be effectively utilized in many commercial applications. This is believed to result because aluminum ions are trying to dissolve from the same electrode towards which copper ions are trying to diffuse in order to be plated out galvanically.

It has been advantageously and unexpectedly discovered that the apparatus and method of the invention achieve a greatly improved rate of removal of soluble metal ions from effluent solution in a manner which is continuous and requires a minimal amount of maintenance. In the present invention, aluminum ions leave the donor electrode while copper ions plate out on the acceptor electrode which is in physical contact with a donor electrode. Thus, the ions do not collide in the process of transfer and the apparatus and process of the invention are more efficient and much faster than the prior art.

SUMMARY OF THE INVENTION

The invention provides novel apparatus for removal of soluble metal ions from effluent solutions. The apparatus operates galvanically to reduce the metal ions and cause them to be plated out of solution directly onto an acceptor electrode.

The apparatus of the invention comprises a chamber having an inlet and outlet to facilitate continuous flow of effluent through the chamber. Donor and acceptor electrodes in physical contact are provided in the chamber, either as a multiplicity of acceptor and donor electrode members or an extended "jelly-roll" configuration of acceptor and donor electrode means. The electrodes are configured so as to expose a high surface area, preferably either as screens or expanded or perforated sheets of materials, thereby permitting maximum contact with the effluent being continuously passed thereabout and therethrough.

The donor electrode is made from a metal which is higher in the electromotive series than the metal ion to be recovered from the effluent. The acceptor electrode is made from a conductive material other than that of which the donor electrode is made.

The apparatus of the invention may be further provided with optional means for maintenance and adjustment of the pH level of the effluent solution to a sufficiently low level to help active the donor electrodes. Any acid that can lower the pH of the effluent to the reactive level can be utilized. Also it has been found that the presence of halogen ions, such as chloride, also contribute to the activation of the donor electrode. Preferably, hydrochloric is utilized, since it provides both low pH and chloride ions.

In accordance with the invention, a method for removal of soluble metal ions is provided by treatment of effluent with the apparatus of the invention. The effluent containing the soluble metal ions to be removed is first treated, if needed, to adjust the pH to a reactive level which is highly acidic, and preferably between 2.0-3.5. If the pH drops below recommended levels, then the efficiency of the apparatus and method decreases rapidly due to the excess accumulation of hydrogen ions at the electrode surface. The effluent is then passed continuously through the apparatus of the invention, whereby it flows through and in close contact with high surface area acceptor and donor electrodes which are in physical contact. Due to the galvanic action of these electrodes in contact with soluble metal ions in the effluent solution, the metal ions are plated onto the acceptor electrode and thereby removed from solution. The effluent then flows from the apparatus of the invention through an outlet which is positioned just below the level of the uppermost portion of the electrodes. The treated effluent then may be further treated or directly recycled into the environment, as may be desired.

It is an object of the invention to provide apparatus which is reliable, requires minimal maintenance and is highly efficient in the removal of soluble metal ions from a continuously flowing effluent containing the same.

It is a further object of this invention to provide apparatus to remove soluble metal ions from effluents having a low concentration thereof.

It is yet a further object of the invention to provide apparatus for the removal of soluble metal ions which may be configured so as to be adaptable to various types of commercial applications which require removal of soluble metal ions from effluent solutions, depending upon the flow rate, type of metal ions, pH, temperature, concentration and like parameters involved.

It is yet a further object of the invention to provide a method for removal of soluble metal ions providing the objects and advantages as set forth hereinabove.

Other objects and advantages of the apparatus and method of the invention will be readily apparent to those skilled in the art through study of the description of the preferred embodiments and the appended claims.

The features of the invention which are believed to be novel are particularly set forth and distinctly claimed in the concluding portion of the specification. The invention, however, both as to its organization and operation, together with further objects and advantages thereof may best be appreciated by reference to the following detailed description of the preferred embodiments and appended claims, all taken in conjunction with the drawings, wherein:

FIG. 1 is a side elevational view of the principal embodiment;

FIG. 2 is a top plan view of the principal embodiment shown in FIG. 1;

FIG. 3 is a sectional top view, with the central portion broken away, taken along line 3—3 of FIG. 1;

FIG. 4 is a sectional side view, with the central portion broken away, taken along line 4—4 of FIG. 2;

FIG. 5 is a face view, partially broken away, of the donor and acceptor electrodes of the preferred embodiment;

FIG. 6 is a side elevational view of an alternative embodiment, partially broken away;

FIG. 7 is a top plan view of the alternative embodiment shown in FIG. 6;

FIG. 8 is a face view, partially broken away, of the donor and acceptor electrodes utilized in the alternative embodiment shown in FIG. 6;

FIG. 9 is a side elevational view of optional pH adjustment means, showing a portion of the preferred embodiment of FIG. 1 in section and showing schematic representation of supporting members;

FIG. 10 is a top sectional view, with the center portion broken away, of a second alternative embodiment, taken along line 3—3 of FIG. 1; and FIG. 11 is a side sectional view, with the center portion broken away, of the second alternative embodiment, taken along line 4—4 of FIG. 2.

DESCRIPTION OF THE PREFERRED EMBODIMENTS

The principal embodiments of the invention comprise a method and apparatus for removal of soluble metal ions from an effluent solution which are best described and understood with reference to FIGS. 1-5 and 9.

The apparatus of the principal embodiment comprises a treatment chamber defined by rectangular tank 1 having endwalls 2 and 3, sidewalls 4 and 5 and bottom 6. The top of the tank is preferably left open to permit escape of any gases formed, although it is fully within the purview of the invention that a top or cover could be utilized, provided that there is adequate ventilation for any gases which may be generated inside tank 1.

Inlet 7a is preferably divided into two portions for improved distribution and joined to endwall 2 through inlet openings 7b, which are preferably located in the lower portion of endwall 2. Outlet 8 is provided in endwall 3 in the upper portion thereof, just below the upper portion of galvanic electrodes 9. It is fully within the purview of the invention that either the inlet or outlet can be configured in equivalent designs which provide one or more openings for passage of effluent into and out of the treatment chamber.

Sidewalls 4 and 5 are provided with a multiplicity of vertically oriented slots 4a and 5a, respectively, which are parallel to each other and configured to accept galvanic electrodes 9, which are provided as rectangular members slideably insertible into opposite and parallel slots 4a and 5a in tank 1.

With reference to FIGS. 3 and 4, galvanic electrodes 9 are shown as comprising a donor electrode screen 10 and acceptor electrode screen 11 which are in physical contact with each other. Physical contact between donor electrode screen 10 and acceptor electrode screen 11 may be achieved in any conventional manner, either with or without the assistance of a bonding or adhesive material or use of mechanical means such as clamps, clips or the like, to hold them in contact.

FIG. 5 shows a partially broken-away section of a single galvanic electrode 9, utilized in accordance with the principal embodiment of the invention. Donor electrode 10 is a screen of aluminum and acceptor electrode 11 is a screen of stainless steel.

In one principal embodiment of the invention, as best illustrated in FIGS. 3 and 4, the galvanic electrodes 9 comprise two screens of metal comprising donor electrode 10 and acceptor electrode 11, respectively. The donor electrode can be made from any metal which is higher in the electromotive series than the metal which is to be recovered from the effluent utilizing the apparatus and method of the invention. For purposes of this invention, the electromotive series for common metals constitutes, in descending order; magnesium, beryllium, aluminum, manganese, zinc, chromium, iron, cadmium, cobalt, nickel, tin, lead, copper, mercury, silver, platinum, and gold.

While for purposes of the invention any soluble metal ion which is lower in the electromotive series than the material constituting the donor electrode, the preferred soluble metal ions to be treated are cadmium, nickel, lead, copper, mercury, silver, and gold. Most preferred is copper. The apparatus of the invention is operable to remove copper ions from solution, even in the presence in such solution of chelating or complexing agents, such as citrate, ethylene diammine and the like.

Preferably, the donor electrode is aluminum, since it is not only higher than most metals in the electromotive series, but also because of its ready availability in the form of screen or an expanded sheet having a reinforced structure and relatively low cost. A perforated or like sheet through which effluent can flow can also be used. Furthermore, aluminum is preferred as the donor electrode because the aluminum salts, which form in the effluent solution as the soluble metal ions contained therein are removed, are environmentally more acceptable and adaptable to conventional methods for removal from the treated effluent, if required.

The preferred materials for the acceptor electrode 11, where copper is to be removed from solution, are copper, stainless steel or carbon. Stainless steel is particularly preferred not only because it too is readily available in screen form and is relatively inexpensive, but also because the copper which is removed from an effluent containing copper ions is deposited thereon with poor adherence. Consequently, it either flakes off and falls to the bottom of the treatment tank, where it can readily be removed and recovered, or it can be easily stripped from the screen elements in conventional manner when the screens are removed from the treatment tank for periodic cleaning. For example, accumulated copper can be chemically stripped from the screens comprising acceptor electrodes.

A multiplicity of galvanic electrodes 9 are provided as screens or perforated sheets of materials forming donor electrodes 10 and acceptor electrodes 11, which are fitted parallel to one another in vertically extending slots 4a and 5a provided along the length of each of sidewalls 4 and 5, respectively.

A preferred modification of the principal embodiment of the invention comprises apparatus which utilizes a multiplicity of galvanic electrodes 19, as illustrated in FIGS. 10 and 11. Galvanic electrodes 19 comprise a sandwich of sequential layers of acceptor electrode 20 made of stainless steel screen, donor electrode 21a made of aluminum screen, donor electrode 21b made of an expanded or perforated sheet of aluminum, another layer of donor electrode 21a made of aluminum screen and a final layer of acceptor electrode 20 made of stainless steel screen, all of these individual electrodes being in physical contact with the electrode or electrodes adjacent thereto. The advantage of using this particular galvanic electrode configuration is that each galvanic electrode has greater structural integrity, as well as maximum donor electrode surface area.

It is fully within the purview of the invention that any sequence of donor or acceptor electrodes is equivalent for purposes of the invention and can be utilized in accordance therewith. Furthermore, while at least one galvanic electrode comprising an acceptor electrode and donor electrode in physical contact must be utilized in the apparatus of the invention, it is preferable that a multiplicity of such galvanic electrodes be utilized, without limitation as to the number. For practical purposes, the maximum number of galvanic electrodes utilized in the apparatus of the invention is the number required to remove sufficient soluble metal ions to reach a desired concentration, which may approach zero, in view of the initial concentration, flow rate and dwell time. While a greater number of galvanic electrodes may be used, there is no technical or economical advantage in doing so.

An alternative embodiment of the apparatus of the invention is illustrated in FIGS. 6, 7 and 8. In this embodiment, cylindrical tank 100 forming a cylindrical treatment chamber is utilized, having cylindrical sidewall 101 and bottom 102. Inlet 103a is provided and extends vertically downward into the center of the cylindrical tank 100 and has an inlet opening 103b located near the lower portion thereof. Outlet 104 is provided in the upper portion of sidewall 101 and located just below the upper surface of "jelly-roll" electrode 110.

In this alternative embodiment the galvanic electrode comprises a "jelly-roll" electrode 110, which comprises extended donor electrode 111 and extended acceptor electrode 112 in physical contact with each other. The "jelly-roll" electrode 110 spirals outwardly from the vertical axis in the center of cylindrical tank 100 and to sidewall 101.

FIG. 8 illustrates a partially broken-away section of "jelly-roll" electrode 110 and shows the donor electrode 111 and acceptor electrode 112 provided in screen configurations.

For purposes of the invention, it is required not only that the donor and acceptor electrodes are in physical contact with one another, but that such contact is sufficient to allow the desired galvanic action to occur. Furthermore, in such contact, sufficient openings or the like must be provided so that effluent solution can flow therethrough. Accordingly, it is preferred that these electrodes are provided in the form of screens of donor and acceptor electrode materials or expanded or perforated sheets of the same. Nevertheless, it is fully within the purview of the invention that the donor and acceptor electrodes may be configured in any equivalent manner which allows for passage or flow of the effluent material therebetween, while retaining physical contact with adjacent acceptor and donor electrodes which comprise the galvanic electrode.

Although optional for purposes of the invention, it is preferred to incorporate with the apparatus of the invention a means for monitoring and maintaining the pH of the effluent solution. Such monitoring and pH adjustment means are illustrated in FIG. 9 in association with the principal embodiment of the invention.

Upstream from inlet 7a is provided a pH probe 201 which constantly monitors the pH of the effluent passing therethrough and is connected to a pH adjustment and controller device 206. Responsive to the pH level, as measured by pH probe 201, the pH adjustment and controller device 206 controls metering pump 203 which delivers a pH adjustment material, preferably hydrochloric acid from storage tank 205 into the effluent line 300 through check valve 204, which prevents back flow of pH adjustment material into the effluent line 300.

Downstream of check valve 204 and upstream of pH probe 201 it is desirable to provide means for mixing the pH adjustment material introduced into the effluent stream through check valve 204, so that an accurate and consistant pH reading is obtained by pH probe 201. Preferably, such mixing means may comprise, as is illustrated in FIG. 9, a series of angular bends in the effluent line 300; namely, four right-angle bends 202a, 202b, 202c, and 202d, which form a generally "U"-shaped configuration. It is, of course, fully within the purview of the invention that any equivalent configuration of the effluent line between the check valve 204 and pH probe 201 may be utilized, as well as any other conventional type of means for mixing the pH adjustment material with the effluent solution.

In accordance with the preferred embodiment of the method of the invention, an effluent solution containing soluble metal ions is passed through or caused to flow about physically contacting electrodes which comprise a donor electrode made of a metal higher in the electromotive series than the metal ions to be removed and an acceptor electrode which is made of stainless steel or any conductive material or metal lower in the electromotive series than the metal to be removed. Both the donor and acceptor electrodes must be configured in a manner which allows for exposure of high surface area of donor and acceptor electrodes and facilitate passage of the effluent therethrough.

Optionally, it is preferred that the pH of the effluent to be treated in accordance with the invention should be maintained at a pH between about 1.5-4.0 and preferably between about 2.0-3.5, so as to facilitate activation of the donor electrodes. At a lower pH, while the apparatus and method are operable, excessive consumption of the donor electrode may be experienced. However, at a high pH the apparatus and method may cease to operate to remove soluble metal ions from the effluent.

It is also desirable to have halogen ions, preferably chloride ions, present in at least 0.1 g/l to facilitate activation of the donor electrodes. Preferably, 0.5-100 g/l of chloride ion should be maintained in the effluent solution, prior to treatment. Often there is sufficient chloride ion present so that adjustment may not be required. Sodium hydroxide or like alkali materials may be added to the effluent to adjust the pH if it falls below 1.5, while hydrochloric acid is preferably added to reduce the pH, if it is in excess of 4.0. Generally, the effluent from copper plating operations rarely requires pH adjustment to a higher value and normally requires only addition of hydrochloric acid to lower the pH to within the desired range, while at the same time insuring that sufficient chloride ion is present. Sulfuric or mineral acids can be used in conjunction with hydrochloric acid, or substituted for hydrochloric acid when choride ion are provided from another source, such as sodium chloride.

It has been discovered that by utilizing the method and apparatus of the invention fast and efficient recovery of soluble metal from effluent could be achieved, even when the effluent contained levels of soluble metal ions as low as 100 milligrams per liter (mg/l). Passage of such effluent through the apparatus and treatment thereof in accordance with the method of the invention reduces the residual concentration of soluble metal ions to less than 10 mg/l.

It was further discovered that a substantial amount of the metal removed from the effluent could be readily recovered. As the metal accumulates on the acceptor electrode, it is deposited as a poorly adhering film, some of which may flake off and settle to the bottom of the treatment chamber. Thus, separation, removal and recovery thereof can be effected simply by periodical draining of the tank and/or filtering of the treated effluent. As indicated previously, the acceptor electrode can be removed from the apparatus and copper adhering thereto chemically stripped by conventional methods.

EXAMPLE 1

Apparatus of the invention was constructed comprising a cylindrical metal tank having extended "jelly-roll" type galvanic electrodes. The donor electrode utilized was 18×16 mesh aluminum window screen (0.011 inches in diameter) and the acceptor electrode utilized was 16 mesh stainless steel screen (0.018 inches in diameter). These two screen elements (both 18 inches high and 100 feet in length) were placed physically into contact with each other and rolled up to form a "jelly-roll" of sufficient size to fit into the cylindrical tank. The donor and acceptor electrodes each comprised 150 sq. ft. in area and the tank was of 50 gallon (U.S.) capacity.

Effluent containing 430 ppm of cupric ions was passed through the cylindrical tank, being delivered from the input conduit into the center of the bottom portion of the tank, so that the effluent material physically passed through the "jelly-roll" screen and was subsequently removed through an outlet provided in the upper portion of the tank wall. Prior to passage of the effluent through the tank, the pH was adjusted to between 2.5-3.0 by adding 6 molar hydrochloric acid at a rate of about 40 cc per 5 gallons per minute. At this flow rate, the dwell time of the effluent in the tank was about 10 minutes and the copper concentration of the effluent so treated and continuously removed at the outlet was reduced to 7.5-8.0 ppm.

EXAMPLE 2

Apparatus of the invention was provided comprising a rectangular, open-top tank configured with vertical slots along its side walls which would accept 40 galvanic electrode combinations. Each galvanic electrode combination comprised a piece of aluminum and a piece of stainless steel screen of a size configured to be slideably inserted into the slots formed in the side wall of the tank. When so installed, each combination of stainless steel and aluminum screening was in physical and galvanic contact with the other. At a flow rate of 5 gallons per minute, an effluent containing 425 mg/l of cupric ions, adjusted with hydrochloric acid to a pH of between 3.8-4.0 was passed through the tank. The concentration of cupric ions in the effluent removed at the outlet was 180 mg/l. While this level of cupric ion may be acceptable in some installations, further reduction of comparable scope could be obtained by passage of the treated effluent through another similar unit of the apparatus of the invention.

EXAMPLE 3

A rectangular tank identical to that described in Example 2 was utilized. However, each of the 40 galvanic electrodes utilized comprises, in physical contact, a sandwich formed of a screen of 304 stainless steel (8 mesh, 0.047 inch wire diameter), a sheet of aluminum screen (as in Example 1), and a sheet of expanded aluminum, (formed from 0.081 inch thick sheet, 0.42 lbs. per sq. ft.), which contributed not only to providing additional surface area donor electrode but also provided additional structural integrity and support. Next, another sheet of aluminum screen and finally a sheet of stainless steel screen completed the sandwich comprising each galvanic electrode. Each sandwich measured 19×36 inches, the dimension accepted by vertical slots of the tank utilized.

At a flow rate of 2 gallons per minute, yielding a dwell time of 50 minutes in the tank, effluent having an initial concentration of 1,248 mg/l of cupric ion was passed through the treatment tank. Using 15 such galvanic electrodes, the effluent was found to be reduced to 82 mg/l of cupric ion, with a resulting concentration of 244 mg/l of aluminum, in the form of aluminum ions. Insertion of a full complement of 40 galvanic electrodes resulted in a reduction in the level of cupric ions in the effluent to 16.2 mg/l, with a corresponding concentration of 344 mg/l of aluminum ions.

EXAMPLE 4

Example 3 was repeated, utilizing the rectangular tank having 40 galvanic electrodes inserted therein on the same effluent solution. However, the output effluent from the apparatus was passed through another treatment unit of the invention, as utilized in Example 1. The effluent treated in this manner was analyzed and found to contain only 2.1 mg/l of residual cupric ions, with an accompanying concentration of 354 mg/l of aluminum ions. In this case, the level of cupric ion was well below the compliance level of 5 mg/l for purposes of satisfying local pollution ordinances.

EXAMPLE 5

Example 4 was repeated except that the effluent treated contained ethylene diammine and phosphoric acid, and had an initial concentration of 3,156 mg/l of cupric ion. The pH of this effluent was 6.5, so sulfuric acid was added to lower the pH level to about 4.0 and then hydrochloric acid was added in order to adjust the pH to about 2.5 and to provide chloride ions.

Following treatment of this effluent in accordance with the method and apparatus of the invention as in Example 4, the output effluent was analyzed and found to contain only 10.6 mg/l of soluble cupric ions, with a corresponding concentration of 900 mg/l of aluminum ions.

Although the above Examples are given solely for purposes of illustration, it will be understood that such apparatus and methods may be altered, varied or modified without departing from the spirit and scope of the invention as defined by the appended claims.

What is claimed is:

1. Method for removal of soluble metal ions from a solution containing the same comprising (a) providing said solution having a pH of between 1.5–4.0 and a halide ion concentration of at least 0.1 g/l, and (b) passage of said solution through a chamber having provided therein a multiplicity of galvanic electrode means comprising at least one donor electrode made from a metal which is higher in the electromotive series than said soluble metal ions to be removed from said solution and at least one acceptor electrode made from stainless steel or any conductive material or metal lower in the electromotive series than said metal to be removed from solution, said acceptor and donor electrodes being configured as screens or perforated sheets in physical contact, whereby said soluble metal ions are converted to an insoluble form and thereby removed from said solution.

2. The method of claim 1 wherein the pH of said solution is adjusted to 2.0–3.5 and said halide ion is chloride ion and the concentration of said chloride ion is adjusted to between 0.5–100 g/l.

3. The method of claim 2 wherein the pH of said solution is adjusted by admixture of a mineral acid selected from the group consisting of hydrochloric and sulfuric acid with said solution.

4. The method of claim 3 wherein said mineral acid is admixed with said solution under the control of a pH adjustment and controller means which regulates the amount of said mineral acid added to said solution in response to the measured pH of said solution which is detected by a pH detection means communicating therewith.

5. The method of claim 1 wherein each of said galvanic electrode means comprises a sandwich configuration comprising a plurality of sequentially arranged and physically contacting donor and acceptor electrode means.

6. The method of claim 5 wherein said sandwich configuration which comprises sequentially arranged and physically contacting layers of stainless steel screen, aluminum screen, aluminum expanded or perforated sheet, aluminum screen and stainless steel screen.

7. The method of claim 1 further comprising the step of separating said insoluble form of said metal from said solution.

8. The method of claim 7 wherein said insoluble form of said metal is separated from said solution by plating onto said acceptor electrode means.

9. The method of claim 7 wherein said insoluble form of said metal is separated from said solution by decanting said solution from said chamber, thereby leaving said insoluble form of said metal accumulated therein as metal plated on said acceptor electrodes or as insoluble metal precipitate which settles to the bottom of said chamber and may optionally be removed therefrom.

* * * * *